United States Patent [19]

Brunn

[11] 4,361,364

[45] Nov. 30, 1982

[54] MASTER LINK FOR TRACK CHAIN

[75] Inventor: Hansjoachim Brunn, Damme, Fed. Rep. of Germany

[73] Assignee: Firma Intertrac Viehmann & Co., Gevelsberg, Fed. Rep. of Germany

[21] Appl. No.: 197,124

[22] Filed: Oct. 15, 1980

[30] Foreign Application Priority Data

Apr. 3, 1980 [DE] Fed. Rep. of Germany ....... 3013026

[51] Int. Cl.$^3$ ............................................. B62D 55/20
[52] U.S. Cl. ...................................... 305/58 R; 305/54
[58] Field of Search ........................... 222/39, 54, 58 R

[56] References Cited

U.S. PATENT DOCUMENTS

| | | | |
|---|---|---|---|
| 3,020,096 | 2/1962 | Strnad | 305/58 R |
| 3,659,112 | 4/1972 | Stedman | 305/58 R |
| 3,853,360 | 12/1974 | Khuntia | 305/58 R |

FOREIGN PATENT DOCUMENTS 1193647 6/1970 United Kingdom ...... 305/58 R UX

Primary Examiner—David A. Scherbel
Attorney, Agent, or Firm—Karl F. Ross

[57] ABSTRACT

A track chain has a master link joining together a pair of axis-defining shafts. This master link has a pair of like link parts each mounted on a respective shaft and pivotal about its axis. The link parts have axially confronting inner faces formed with meshing teeth each having an inner flank that faces back toward the respective shaft, that flatly engages the inner flank of the respective tooth of the other link parts, and that forms with the axis of the respective shaft an acute angle. Thus forces urging the shafts radially apart have at these inner flanks have force components urging the parts axially together. No bolts extending axially between the two parts are necessary and the respective track shoe can be bolted to both of the parts of the master link so as to inhibit relative pivoting thereof.

10 Claims, 2 Drawing Figures

MASTER LINK FOR TRACK CHAIN

FIELD OF THE INVENTION

The present invention relates to a master link for a track chain.

BACKGROUND OF THE INVENTION

The present invention relates to a master link, of the type generally described in U.S. Pat. No. 3,659,112, that is usable in a track chain of the type generally described in U.S. Pat. No. 3,601,212. Such a track chain normally has a plurality of parallel shafts, each formed by a coaxial pin and bushing and linked together by pairs of links. A track shoe is secured to each pair of links between the respective shafts.

A master link is provided so that the endless track formed by an annular succession of such links can be opened for mounting on the respective guides and for servicing in general. It is critical that this master link be at least as strong as the other links of the chain.

Normally the master link comprises, like the rest of the chain, two axially spaced links between the respective shafts. Each of these links is, however, formed by two separate link parts that have axially engaging inner faces. The two links parts of each such link are secured axially together. In the older prior-art system this was done simply by bolting them together, forcing their faces into tight axial engagement with each other. This system was found largely deficient as the enormous forces urging the shafts radially apart were sufficient to shear the bolts in many cases.

Thus recourse was had to the system described in above-mentioned U.S. Pat. No. 3,659,112. The inner faces of the individual link parts are formed with interengaging teeth meshed with one another. At the same time the bolts are provided to axially secure each link part with the other respective link part. The use of such toothing thus greatly reduce the shear forces to which these bolts are subjected.

The specific disadvantage of such a system is, however, that if the attachment bolt loosens at all, as is frequently the case due to simple thermal expansion and contraction combined with the enormous load such links are subjected to, the radial forces between the respective shafts have to be taken up almost exclusively by the bolt. The result is, once again, subjecting the attachment bolt to considerable shear forces which can lead to sudden failure capable of producing a serious accident. Any in-the-field failure of such a track chain often entails considerable down time for a very expensive piece of equipment and requires extremely difficult on-the-job repairs.

OBJECTS OF THE INVENTION

It is therefore an object of the present invention to provide an improved master link for a track chain.

Another object is to provide such a master link which is stronger than the hitherto known master link.

SUMMARY OF THE INVENTION

These are attained according to the present invention in a master link of the above-described general type, having teeth on the axially confronting inner faces of the link parts. According to this invention each of these teeth has an inner flank facing back toward the respective shaft, flatly engaging the inner flank of the respective tooth of the other link part, and forming with the axis of the respective shaft an acute angle. Thus according to the present invention forces urging the shafts radially apart have at these inner flanks force components which urge the link parts axially together. In this manner as the force urging the shaft increases the force urging the two link parts together will similarly increase.

According to another feature of this invention it is possible to completely dispense with the bolts that pass axially between the two link parts to secure them together. Instead the link parts can be counted on to remain tightly engaged together simply by the longitudinal tension in the chain, effective radially between the two axes of the master link. Each of the link parts is formed with a respective threaded bore and the track shoe is formed at each end with two holes of substantially greater diameter than these threaded bores. Thus bolts pass loosely through these holes and engage the bores so that the attachment of the track shoes will have no effect on the proper engagement of the inner flanks of the teeth.

According to further features of this invention each of the teeth is arcuate and has a center of curvature which corresponds to one of the axes, normally the axis of one of the link part. Thus the teeth can be brought into mesh by rotating one of the parts about the respective axis without axial displacement of the two parts relative to each other. Such an arrangement greatly eases the assembly and disassembly of a track chain incorporating such a master link.

According to further features of this invention the teeth and the grooves defined between them have rounded edges. They meet in surface contact with each other. In the event that the tolerances are not quite perfect limited plastic deformation of the teeth will, however, insure a perfect fit between the two link parts.

Thus with the master link according to the instant invention the possibility of mechanical failure of the master link is extremely small. No loosening of the attachment zone is possible, as the force urging the two link parts together is directly porportional to the tension in the chain. Furthermore the links can be relatively easily assembled by pivoting together the two parts; a pivoting of these parts away from each other being impossible once the respective track shoe is secured in place. As no element need engage axially between the two link parts to secure them together, the inherent weakening of the structure by providing passages for such elements is eliminated and, therefore, the strength of the master link according to this invention is augmented.

SPECIFIC DESCRIPTION

Figure 1:
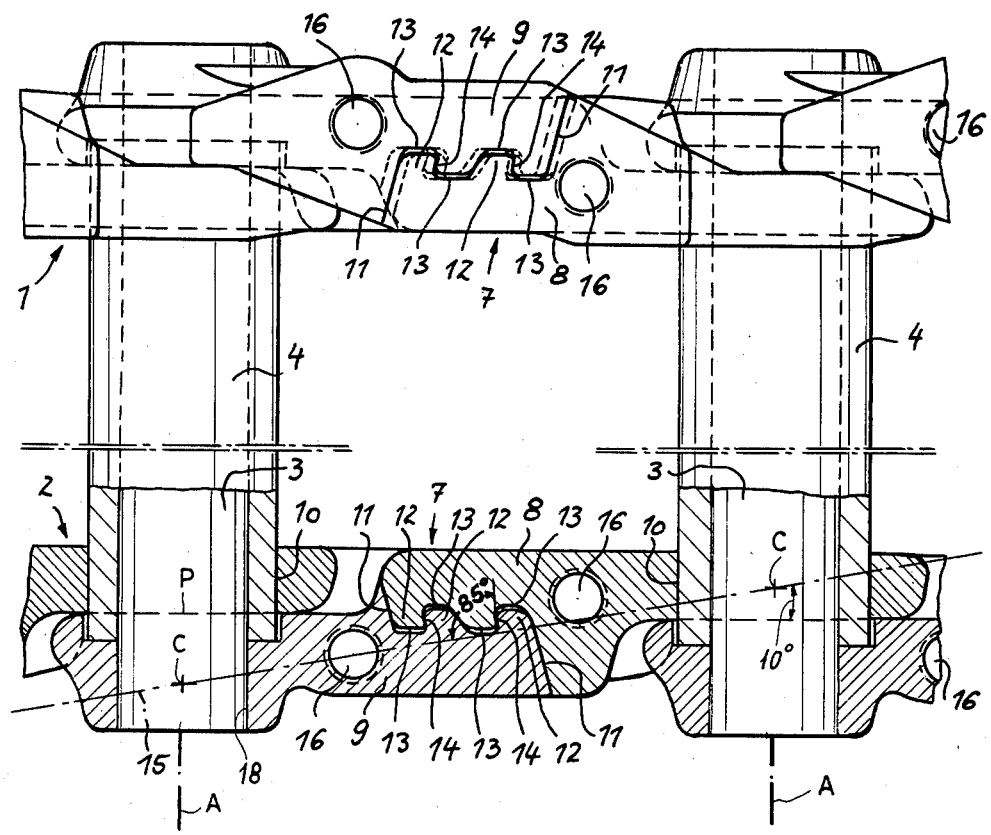
FIG. 1 is a top partly sectional view of a master link according to this invention.
Figure 2:
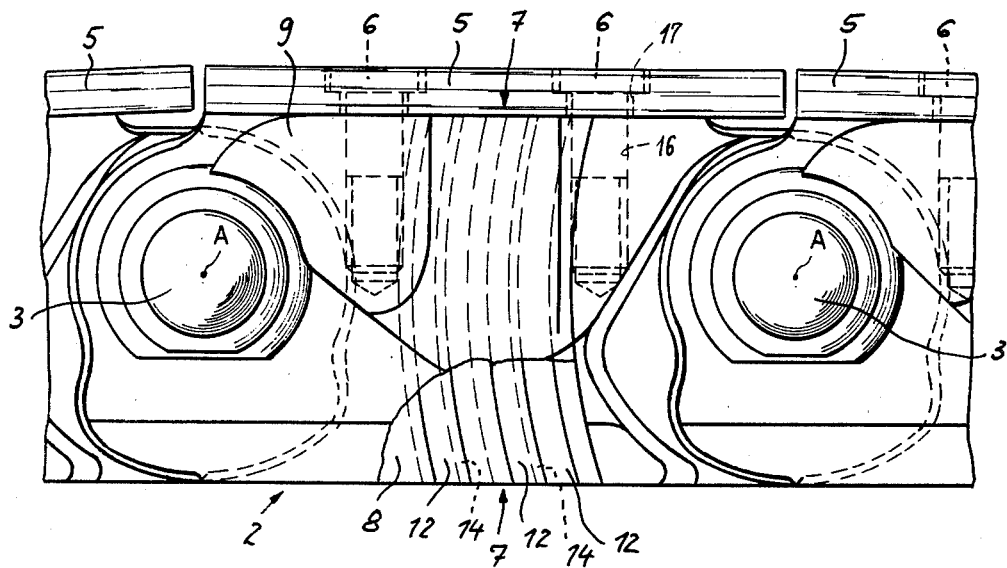
FIG. 2 is a side view of the structure of FIG. 1.

As shown in FIGS. 1 and 2, a track chain according to the instant invention has a succession of standard links 1 and 2 joined together at shafts constituted by inner pins 3 and outer bushings 4 together defining axes A. Track shoes 5 are secured by screws 6 to the links 1 and 2. In addition master links 7 are provided which are each formed by an inner link part 8 and an outer link part 9 of generally identical construction. The inner link part 8 is formed with a bore 10 force-fitted around the respective bushing 4 and the outer part 9 is formed with a bore 18 force-fitted around the opposite pin 3. The parts 8 and 9 have ends 11 which engage each other in surface contact generally radially of the axes A.

In addition each of the parts 8 and 9 has an inner surface formed with two teeth 12 defining respective grooves 13 centered on one of the axes A. Each tooth 12 therefore engages in a respective groove 13. In addition each tooth 12 has an inner flank or face 14 directed back toward the respective axis A and inclined at an acute angle to the respective axis A. Each of these faces 14 is inclined to a force line 15 passing between locations or centers C where the respective parts 8 and 9 are joined to the respective bushing and pins 4 and 3, these locations or centers C being shown on the respective axes A. The angle of each of these faces 14 to this line 15 is 85° and this line 15 forms an angle of 10° to a perpendicular P that passes radially through the two axes A, so that the flanks 14 are inclined at an angle of 75° to the perpendicular P and 15° to the respective axis A.

Furthermore each of the parts 8 and 9 is formed with a threaded bore 16 open upwardly as seen in FIG. 2 and receiving a respective one of the screws 6 holding the respective shoe 5 in place. The shoe is formed in alignment with each of these threaded bores 16 with a somewhat larger unthreaded bore 17 so that securing the shoe 5 to the master link will not displace the teeth 12 out of mesh with one another.

With the system according to the instant invention tension forces in the chain urging the axes A radially apart will have a force component urging the parts 8 and 9 axially together. Thus as the tension in the chain increases the grip of the teeth 12 on each other will further increase. These teeth 12 are made to close tolerances, but any discrepancies in tolerances will quickly be overcome by modest plastic deformation of the teeth 12 for perfect fitting-together of the teeth 12 in surface contact.

If the teeth 12 are centered on the axis of part A (although their radius of curvature is larger in the embodiment actually illustrated in FIG. 2), the two parts 8 and 9 of the link 7 can be interengaged by swinging the part 8 about its axis A to bring its teeth 12 into mesh with the grooves 13 of the part 9. Once they are in proper mesh the respective shoe 5 is bolted in place, preferably after the chain has been completely tensioned. Thus it is not necessary axially to displace the parts 8 and 9 relative to each other to mesh the teeth or to move the axes A closer together than they normally would have to be during use of the chain according to this invention.

I claim:

1. In a track chain having a master link joining together parallel axis-defining shafts and wherein said master link has a pair of like link parts each mounted on a respective shaft and pivotal about its axis, said link parts having axially confronting inner faces formed with meshing teeth, the improvement wherein:
each of said teeth has an inner flank facing back toward the respective shaft, flatly engaging the inner flank of the respective tooth of the other link part, and forming with the axis of the respective shaft an acute angle inclined relative to the respective axis such that forces urging said shafts radially apart have at said inner flanks components urging said parts axially together.

2. The improvement defined in claim 1 wherein each of said teeth is arcuate with a center of curvature at one of said axes, whereby said teeth can be meshed by rotating one of said parts about the respective axis and without axial displacement of the two parts relative to each other.

3. The improvement defined in claim 2 wherein said parts are formed with respective parallel bores perpendicular to the plane of said axes, said chain further comprising at said link a track shoe extending parallel to said plane and respective screws engaged through said shoe and in said bores.

4. The improvement defined in claim 3 wherein said shoe is formed with holes of substantially greater diameter than said screws, whereby same fit with play in said holes.

5. The improvement defined in claim 1 wherein said teeth are rounded.

6. The improvement defined in claim 1 wherein said angle is between 10° and 20°.

7. The improvement defined in claim 1 wherein master link includes two such pairs of link parts spaced axially apart and generally parallel to each other.

8. The improvement defined in claim 1 wherein said shafts each include a pin and a bushing coaxial therewith, one of said link parts being mounted on the pin of the respective shaft and the other link part being mounted on the bushing of the respective shaft.

9. The improvement defined in claim 1 wherein said link parts engage the respective shaft at axially offset locations, said inner flanks forming acute angles with an imaginary line through said locations.

10. In a track chain having a master link joining together parallel axis-defining shafts and wherein said master link has a pair of like link parts each mounted on a respective shaft and pivotal about its axis, said link parts having axially confronting inner faces formed with meshing teeth, the improvement wherein:
each of said teeth has an inner flank facing back toward the respective shaft, flatly engaging the inner flank of the respective tooth of the other link part, and forming with the axis of the respective shaft an acute angle inclined relative to the respective axis such that forces urging said shafts radially apart have at said inner flanks components urging said parts axially together;
each of said teeth is arcuate with a center of curvature at one of said axes, whereby said teeth can be meshed by rotating one of said parts about the respective axis and without axial displacement of the two parts relative to each other;
said parts are each formed with respective parallel bores perpendicular to the plane of said axes; said chain further comprising:
a track shoe at said link extending parallel to said plane, and
respective screws engaged through said shoe and in said bores;
said shoe being formed with holes of substantially greater diameter than the respective screws, whereby same fit with play in said holes.

* * * * *